United States Patent [19]

Moran, III et al.

[11] Patent Number: 5,870,429

[45] Date of Patent: Feb. 9, 1999

[54] APPARATUS METHOD, AND SOFTWARE MODEM FOR UTILIZING ENVELOPE DELAY DISTORTION CHARACTERISTICS TO DETERMINE A SYMBOL RATE AND A CARRIER FREQUENCY FOR DATA TRANSFER

[75] Inventors: John L. Moran, III, Millville; Sanjeev Verma, Arlington, both of Mass.; William Leslie Brown, Mississauga, Canada

[73] Assignee: Motorola, Inc., Schaumburg, Ill.

[21] Appl. No.: 664,757

[22] Filed: Jun. 17, 1996

[51] Int. Cl.$^6$ ................................. H04B 1/38; H04L 5/16
[52] U.S. Cl. .......................... 375/222; 375/225; 370/252; 455/67.3
[58] Field of Search ..................... 375/222, 219, 375/225, 227, 285, 377, 224; 370/252, 327.6; 455/67.3, 63, 73; 379/93.32, 93.33

[56] References Cited

U.S. PATENT DOCUMENTS

5,802,446   9/1998   Giorgi et al. ........................... 375/222

*Primary Examiner*—Stephen Chin
*Assistant Examiner*—Betsy L. Deppe
*Attorney, Agent, or Firm*—John W. Powell

[57] ABSTRACT

An apparatus, software modem, and method for a data communications device, such as a modem (100, 101), to determine a symbol rate and carrier frequency, from a received probe signal, for optimizing a bit rate for data transmission and reception. The various embodiments utilizing a processor (108) or a digital signal processor (106) receive a probe signal, which also typically contains noise and other distortions, particularly envelope delay distortion. The various method and apparatus embodiments then determine a variance of the envelope delay distortion, either directly or indirectly as a correlate of attenuation distortion or as a correlate of a selected transmit pre-emphasis filter specified under the ITU V.34 protocol. The variance of the envelope delay distortion is then utilized to eliminate or disable certain symbol rates and corresponding carrier frequencies in the determination of an optimal symbol rate and carrier frequency for data transmission and reception.

29 Claims, 5 Drawing Sheets

LOOP 1 REFERENCE = 11.0 μs
LOOP 2 REFERENCE = 40.8 μs
LOOP 3 REFERENCE = 48.7 μs
LOOP 4 REFERENCE = 69.1 μs
LOOP 5 REFERENCE = 81.5 μs
LOOP 6 REFERENCE = 458.6 μs
LOOP 7 REFERENCE = 539.7 μs

APPARATUS METHOD, AND SOFTWARE MODEM FOR UTILIZING ENVELOPE DELAY DISTORTION CHARACTERISTICS TO DETERMINE A SYMBOL RATE AND A CARRIER FREQUENCY FOR DATA TRANSFER

FIELD OF THE INVENTION

This invention relates in general to data communications devices and, more particularly, to an apparatus, method, and software modem for utilizing envelope delay distortion characteristics to determine a symbol rate and a carrier frequency for data transfer.

CROSS-REFERENCE TO RELATED APPLICATION

This application is related to the following U.S. patent applications, incorporated herein by reference, with priority claimed for all commonly disclosed subject matter:

U.S. Pat. No. 5,533,049, entitled "Method, Digital Signal Processing Module And System For Efficiently Selecting A Pre-Emphasis Filter During Line Probing.

U.S. Pat. No. 5,715,277, entitled "Apparatus And Method For Determining A Symbol Rate And A Carrier Frequency For Data Transmission And Reception.

BACKGROUND OF THE INVENTION

Presently, data communications devices ("DCDs") and other data communications equipment ("DCE"), such as analog and digital modems, terminal adapters and routers, for example, are used to transfer or transport data between data terminal equipment ("DTE") such as personal computers, workstations, mainframe computers, and other terminals, over various communications channels such as telephone lines, T1 or ISDN lines, which also may be part of a computer network. Typically, the data is transmitted, received, or otherwise transferred in the form of a digitally encoded communication signal, which may include, for example, digitally encoded data transmitted on a carrier signal, having a predetermined or otherwise specified center (carrier) frequency, that is modulated by a predetermined constellation (or transmit constellation) of signal points (such as quadrature amplitude modulation), at a particular (and usually predetermined) signaling or symbol rate (also referred to as a baud rate). In current and proposed systems, the signaling constellation may include from five hundred to over 1600 signaling points. For a given channel, the data throughput will vary as a function of both the symbol rate and the carrier frequency.

At the sending or transmitting DCE, a carrier signal is thus modulated with the set of constellation signal points corresponding to the digital code or value to be transported over the channel. The channel, however, typically introduces or allows a variety of impairments or noise which affect the transmitted signal, such as amplitude and phase distortion, envelope delay distortion, non-linear distortion, additive noise, white noise, and other distortions. The level of distortion in the channel may limit the rate of data transport, as certain data rates, such as the 28.8 kbps available under International Telecommunications Union (ITU) Recommendation V.34, require reasonably high signal to distortion (noise) levels. Before the digital data is transported, therefore, a symbol rate and carrier frequency should be chosen which optimizes or maximizes the data throughput for a given channel.

With the advent of the V.34 protocol, multiple symbol rates and carrier frequencies are now available for selection in data transfer, in contrast with the prior art which largely relied upon fixed symbol rates and carrier frequencies. In addition, different channel characteristics may be more or less significant for the determination and optimization of a data rate which may be supported by a selected symbol rate and carrier frequency under the V.34 protocol. Accordingly, a need has remained for an apparatus, software modem, and method to rapidly and efficiently determine a symbol rate and carrier frequency for data transmission, to optimize data throughput for given channel conditions or characteristics, such as envelope delay distortion characteristics, and also for a given type of channel, such as ADPCM or those containing PCM codecs.

DETAILED DESCRIPTION OF THE INVENTION

As discussed in greater detail below, a need has remained for an apparatus, software modem, and method to rapidly and efficiently determine a symbol rate and carrier frequency for data transmission, to optimize data throughput for a given type of channel, such as ADPCM, and also for given channel conditions or characteristics, such as envelope delay distortion (EDD) characteristics. In accordance with the present invention, envelope delay distortion characteristics are utilized to select a symbol rate and carrier frequency to maximize actual data throughput. In many DCDs, typical equalizers are incapable of spanning the dispersion in time (envelope delay) of various symbol rates and carrier frequencies available under the V.34 protocol. The envelope delay distortion characteristics may be determined by direct measurement of the envelope delay distortion, or may be inferred or approximated by measurement of attenuation distortion. In the preferred embodiment of the present invention, envelope delay distortion is approximated or inferred through measurement of attenuation distortion, which is further coupled with other determinations which are made for the selection of one of the plurality of transmit pre-emphasis filters specified under the V.34 Recommendation, section 5.4. The envelope delay distortion characteristics, directly or indirectly measured or inferred, are then used to exclude various carrier frequencies and symbol rates which, had they been selected, would have been unable to support optimal data transmission rates otherwise available. Exclusion of such carrier frequencies and symbol rates results in a selection of other carrier frequencies and symbol rates which may then support optimal, higher data transmission rates.

Figure 1:
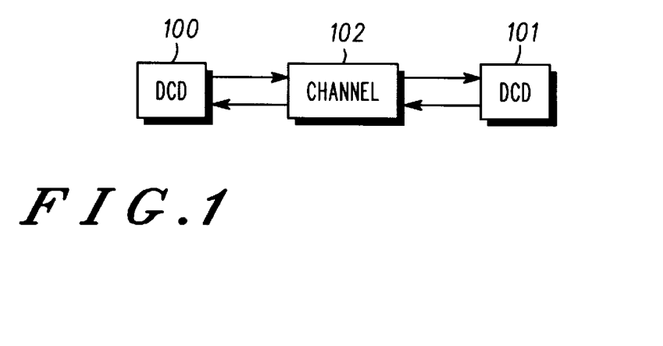
FIG. 1 is a block diagram illustrating modems connected to each other via a channel, for full duplex data transmission and reception.

FIG. 1 illustrates a first DCD 100, such as a first modem, connected to a second DCD 101, such as a second modem, via a channel 102. The modems typically operate in full-duplex, such that each may transmit data and receive data at the same time. In order to compensate for various distortions and impairments which usually exist or occur in the channel during data transmission, various protocols and standards have evolved, such as the ITU Recommendation V.34, involving the use of a probe signal having predetermined, defined characteristics, transmitted from the sending DCD to the receiving DCD, during the initial communication period (training period) in which the two devices train with each other. For example, under the V.34 protocol or standard, the probe signal (also referred to as a line probe) involves the simultaneous transmission of a combination or sequence of twenty-one tones (frequencies) from 150 Hz to 3750 Hz, each tone of equal amplitude and having defined or known phase relationships, with each tone generally separated from other tones at intervals of 150 Hz or integer multiples of 150 Hz, and with some potential tones omitted, such as the 900 Hz, 1200 Hz, 1800 Hz, and 2400 Hz tones. The probe signal is transmitted at two power levels for certain amounts of time, a first high power level known as the L1 probe signal (or the L1 portion of the probe signal), which is set at 6 dB higher power than the nominal level, followed by a second nominal power level known as the L2 probe signal (or the L2 portion of the probe signal). In the United States, a nominal power level is typically −9 dBm or −10 dBm, and in Europe it is typically 0 dBm. The receiving DCD may analyze the received probe signal in light of the standard sequence assumed (or known) to have been transmitted, measuring attenuation distortion (AD) and signal to noise ratio (SNR) across the spectrum (band), in order to determine such transmission parameters as the optimum symbol rate, the optimum carrier frequency, the carrier frequency offset, the timing frequency offset, the degree of non-linearity of the channel, the transmit power level, the optimal bit rate, and the degree of transmit pre-emphasis. With the 150 Hz spacing between tones of the line probe, however, envelope delay distortion may not be measured effectively utilizing the line probe largely because of insufficient resolution of EDD at the band edges (of the spectrum), as discussed in greater detail below. Various references concerning the use and analysis of probing signals include the ITU-T Recommendation V.34; Eyuboglu et al. U.S. Pat. No. 5,048,054, issued Sep. 10, 1991, entitled "Line Probing Modem"; Ling et al. U.S. Pat. No. 4,987,569, issued Jan. 22, 1991, entitled "Fast Training Echo Canceller"; and Sridhar et al. U.S. Pat. No. 5,214,637, issued May 25, 1993, entitled "High Speed Two Wire Modem".

More specifically, and as discussed in greater detail below, the V.34 protocol specifies six symbol rates, 2400, 2743, 2800, 3000, 3200, and 3429 (V.34 Recommendation section 5.2). Each of these symbol rates (except 3429) may have two carrier frequencies, a low carrier and a high carrier (V.34 Recommendation section 5.3). For example, the 3000 symbol rate has a low carrier of 1800 Hz and a high carrier of 2000 Hz. Each of these symbol rates and corresponding carrier frequencies may support a range of data rates. For example, the 3429 symbol rate may support a 28.8 kbps (kilobits per second) data rate, while the 2800 symbol rate may support a 24 kbps data rate. During the initial portion of the training period, a carrier frequency and symbol rate are selected for subsequent data transmission. In addition, under the V.34 protocol, a set of ten transmit pre-emphasis filters are available, each having defined characteristics, such as linear filters and exponential filters. A difficulty arises, however, when a symbol rate and carrier frequency are initially selected during the training period assuming that a first (high) data rate may be supported, but may not be actually achievable in practice. In these circumstances, using the selected symbol rate and carrier frequency, the connected V.34 modems of the prior art will actually train at a second (low) data rate. This second, low data rate essentially results from an erroneous symbol rate and carrier frequency selection due, for example, to the line probe not being sufficiently reflective of the actual, full duplex SNR, and because echo cancellers and equalizers are not operating during the initial, probing portion of the training period, both of which may be significantly affected by large envelope delay distortion. Had a different symbol rate and carrier frequency been selected, however, in accordance with the present invention, the data communication devices may train at a third, intermediate data rate (which is faster than the second (low) data rate, but slower than the first (high) data rate), resulting in optimal data transmission performance.

In accordance with the present invention, the entire probe signal, both L1 and L2 portions, is processed by the local (receiving) DCD during the training period to determine certain parameters or factors of the received probe signal, compared to the defined probe signal assumed (or known) to have been transmitted by the remote (transmitting) DCD. These parameters or factors include the signal to distortion ratios for the various probe signal frequencies and the attenuation distortion levels for the various probe signal frequencies, and more particularly for the preferred embodiment of the invention, the variance (or variation, change or rate of change) of the attenuation distortion (as a correlate of envelope delay distortion, as discussed below) in the higher frequency portion of the spectrum, from 3 kHz to 4 kHz. Based upon an empirical analysis of the variance in the attenuation distortion in this higher 1000 Hz band or portion of the spectrum, thresholds may be determined for the selection of a plurality of symbol rate and carrier frequency combinations, and for the selection of one of the types of transmit pre-emphasis filter available under the V.34 protocol, to optimize the bit rate for data transmission and reception. In the preferred embodiment, the selection of particular transmit pre-emphasis filters is utilized to eliminate various symbol rates (and corresponding carrier frequencies) from selection during the training period.

Figure 2:
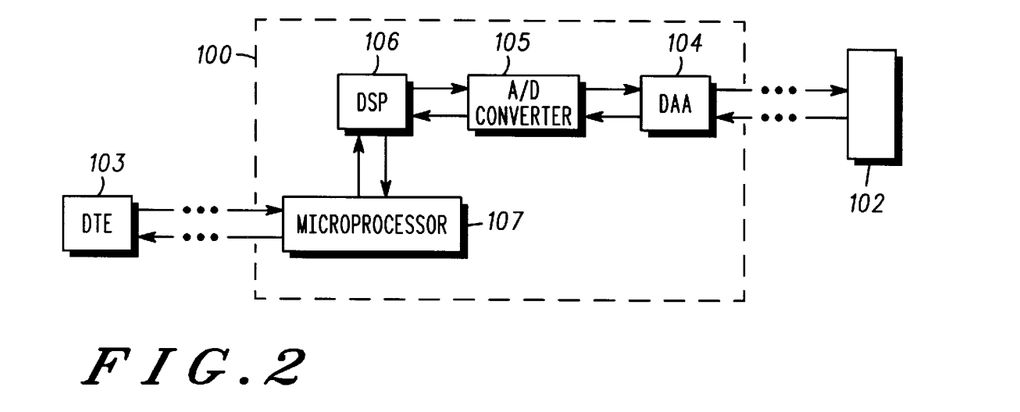
FIG. 2 is a block diagram illustrating a first embodiment of a modem or other DCD in accordance with the present invention.

FIG. 2 is a block diagram illustrating a first embodiment of a modem or other DCD in accordance with the present invention. As shown in FIG. 2, a modem 100 is coupled or connected to a DTE 103, such as a computer, and coupled to a channel 102, for data transmission and reception. Within the modem 100, a data access arrangement 104 known as a "DAA" receives an analog signal transmitted on the channel 102. DMs are known in the prior art and may be made of a variety of discrete components, including analog multiplexers, resistors, capacitors, and operational amplifiers, or may be embodied in whole or part as an integrated circuit, and performs such functions as impedance matching and power level adjustment. Typically connected to the DAA 104 is an analog-to-digital and digital-to-analog converter 105, referred to herein as an analog-digital ("A/D") converter (or equivalently a coder-decoder known as a "codec"), such as an SGS Thompson ST 7544 or ST 7545, which converts an analog signal received from the channel 102 to sampled, digital form, and converts sampled, digital information to analog form for transmission over the channel 102. The A/D converter 105 is then connected to a digital signal processor ("DSP") 106, such as a Motorola M56002. The DSP 106 is used in a first embodiment of the invention herein, performing the various functions described in detail below. The DSP 106 is connected to a microprocessor 107, such as a Motorola M68302, which may be coupled to a DTE 103 to transmit and receive digital information. In the apparatus embodiment illustrated in FIG. 2, the symbol rate and carrier frequency method discussed below with reference to FIGS. 8 and 9 may be programmed and stored, as a set of program instructions for subsequent execution, in the microprocessor 107 and digital signal processor 106, and their associated memories, of a DCD 100, such as a modem.

Figure 3:
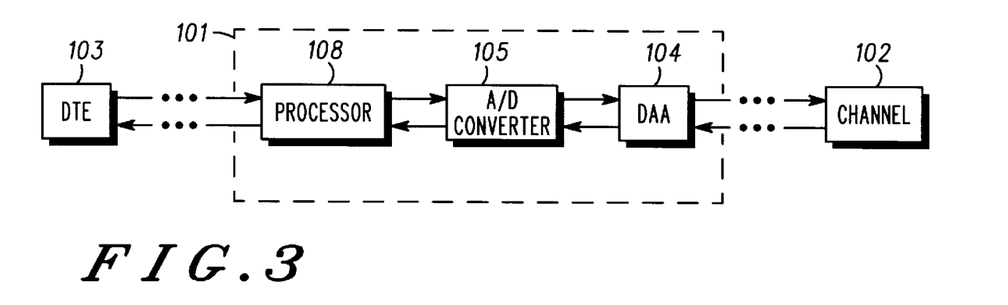
FIG. 3 is a block diagram illustrating a second embodiment of a modem or other DCD in accordance with the present invention.

FIG. 3 is a block diagram illustrating a second embodiment of a modem or other DCD in accordance with the present invention. Referring to FIG. 3, the DAA 104 and A/D converter (or codec) 105 perform the same functions, may be the identical components, and are similarly connected as previously discussed with reference to FIG. 2. In contrast with the modem 100 of FIG. 2, however, FIG. 3 illustrates a modem or other DCE 101 containing a processor 108, such as a Motorola M68356, which performs the functions of both the DSP 106 and the microprocessor 107 of FIG. 2. The processor 108 is used in a second embodiment of the invention herein, also performing the various functions described in detail below. The processor 108 may also be coupled to a DTE 103 to transmit and receive digital information. In the apparatus embodiment illustrated in FIG. 3, the symbol rate and carrier frequency method discussed below with reference to FIGS. 8 and 9 may be programmed and stored, as a set of program instructions for subsequent execution, in the processor 108 and its associated memory, of a DCD 101, such as a modem.

In another "software modem" embodiment, the present invention is embodied as a set of program instructions, which may be stored on any computer readable medium such as a floppy disk or CD ROM. When loaded into a computer, the software modem utilizes the processor available within the computer or other data terminal equipment, such as a Pentium® class processor, which also performs the functions of and may be utilized in lieu of both the DSP 106 and microprocessor 107 illustrated in FIG. 2 or the processor 108 illustrated in FIG. 3. This "software modem" embodiment also utilizes a DAA (or other channel interface) 104 and an A/D converter 105 (both operating as described above) which are or may be contained within an interface apparatus 110 (which also includes other structures such as a memory and an interface to the computer processor) as described in detail in Sridhar et al. U.S. patent application Ser. No. 08/607,911, entitled "Apparatus and Method for Interfacing Between a Communications Channel and a Processor for Data Transmission and Reception", filed Feb. 28, 1996 (as a continuation-in-part of Ser. No. 08/521,717, filed Aug. 31, 1995), incorporated herein by reference. As a consequence of the interchangeability of a DSP, microprocessor, or other processors in these various embodiments, the terms DSP, processor (or microprocessor) are used interchangeably and inclusively herein, such that use of one term may be interpreted to mean and include the various other processor embodiments.

Figure 4:
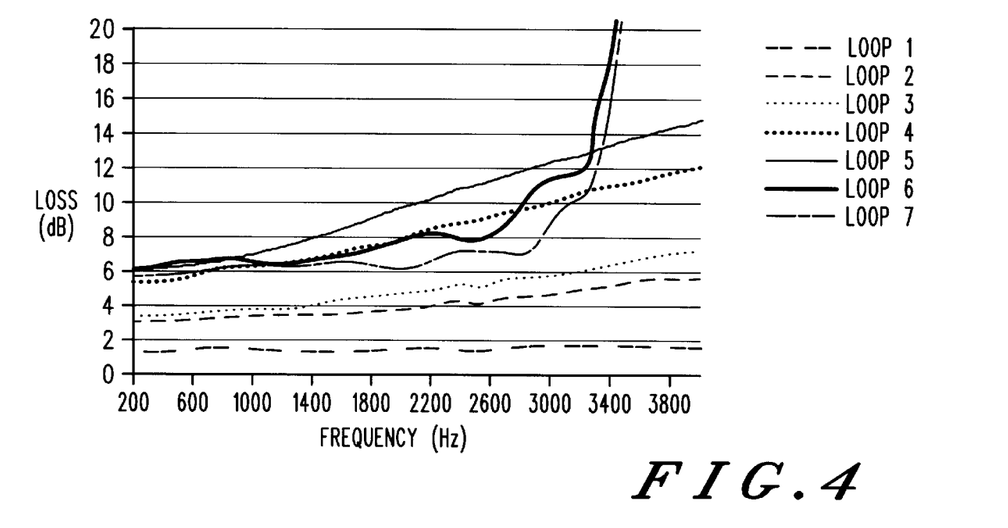
FIG. 4 is a graph illustrating empirical measurements of attenuation distortion for loops 1 through 7 of the ANSI TIA TSB-37A network model.
Figure 5:
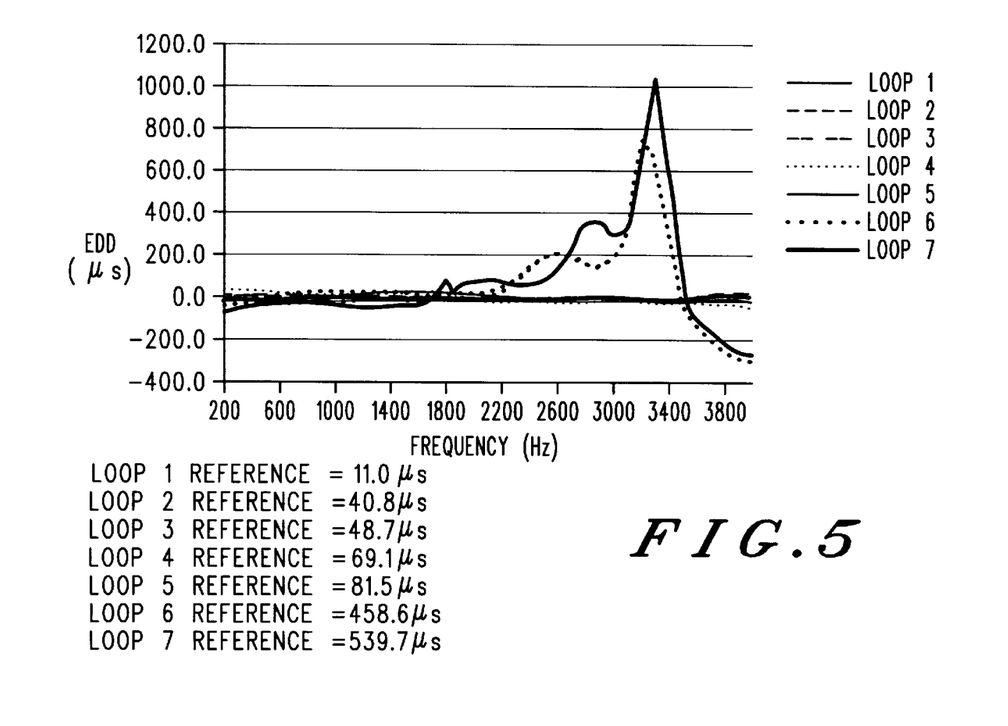
FIG. 5 is a graph illustrating empirical measurements of envelope delay distortion for loops 1 through 7 of the ANSI TIA TSB-37A network model.

For a complete understanding of the apparatus and method of the present invention, it may be helpful to consider its empirical derivation. On any given connection, the network can be divided into three different portions or segments: the local loop, the 4-wire trunk (including PCM codes filter(s) for digital trunks and analog filtering for analog trunks), and the remote loop. The local and remote loops may be either loaded or unloaded. For unloaded loops, the attenuation distortion (AD) is for the most part linear, and the envelope delay distortion (EDD) is approximately zero. As is known in the prior art, these unloaded local and remote loops may be approximated by a simple first order low pass filter, and require no special equalization considerations. However, for loaded loops, both the AD and EDD are non-linear, which may require special equalization and echo canceller considerations. In the United States, ANSI TIA TSB-37A, entitled "Telephone Network Transmission Model For Evaluating Modem Performance" (September, 1994), represents a model of the national public switched telephone network (PSTN), which has also been extended to represent the international PSTN in ITU-T Recommendation V.56 bis, "Network Transmission Model For Evaluating Modem Performance Over 2-Wire Voice Grade Connections" (1995). FIG. 4 illustrates empirical measurements of attenuation distortion for loops 1 through 7 of the ANSI TIA TSB-37A network model, while FIG. 5 illustrates empirical measurements of envelope delay distortion for loops 1 through 7 of the ANSI TIA TSB-37A network model. In FIGS. 4 and 5, loops 1 through 5 are unloaded, while loops 6 and 7 are loaded. As illustrated in FIGS. 4 and 5, as the AD increases rapidly, the EDD also increases rapidly, indicating a correlation between the EDD and the AD, such that a large or significant variance in the envelope delay distortion correlates with a large or significant variance in the attenuation distortion. Such significant variance is illustrated for attenuation distortion in FIG. 4 as the large change in loss in the frequency range between 3000 and 3400 Hz, and such significant variance is illustrated for envelope delay distortion in FIG. 5 as the large change in EDD, also in the frequency range between 3000 and 3400 Hz.

Figure 6:
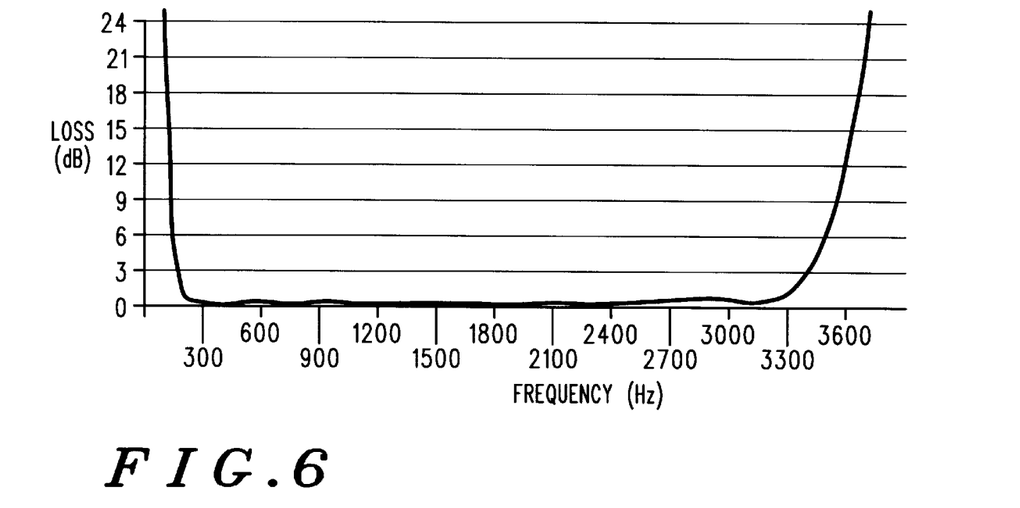
FIG. 6 is a graph illustrating attenuation distortion for an analog switch in a four wire path.
Figure 7:
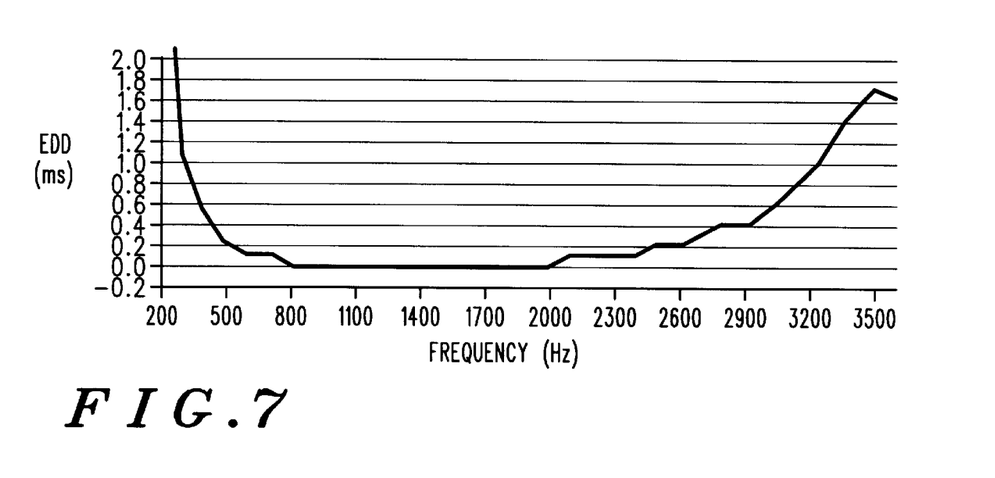
FIG. 7 is a graph illustrating envelope delay distortion for an analog switch in a four wire path.

For the majority of connections in the U.S., which employ digital transport, the AD and EDD that occurs in the 4-wire trunk portion of the network may be due primarily to the PCM codec filters. There may be one, two or even three pairs of PCM codec filters (transmit and receive filters) in a given connection. FIG. 6 illustrates attenuation distortion for an analog switch in the 4-wire path (equivalent to the connection having 2 PCM codec filters in the path), and FIG. 7 similarly illustrates envelope delay distortion for an analog switch in the 4-wire path (also equivalent to the connection having 2 PCM codec filters in the path). Both FIGS. 6 and 7 are from ANSI TIA TSB-37A, and respectively illustrate AD and EDD for a connection which is common in the U.S., in which there is an analog switch in the 4-wire path, which is equivalent to the connection having 2 PCM codec filters in the path. This segment of the network presents a different phenomenon from the loop segments discussed above, in that the PCM codec filter may be best described as a high order bandpass filter (BPF) that is either an elliptical or inverse Chebychev filter design. In both cases, each filter utilizes finite zeroes (complex zeroes) and high Q poles to achieve out of band attenuation requirements while retaining a mostly flat response in band. The net effect is that in the upper transition band of the filter, between 3350 Hz and 3900 Hz, there is a rather large and rapid increase in the EDD relative to the middle of the band. As was the case for AD and EDD for TIA loaded loops 6 and 7 illustrated in FIGS. 4 and 5, for the PCM codec filters illustrated in FIGS. 6 and 7, as the AD rapidly increases, so does the EDD, which may be referred to as a "brick wall" effect. As in the previous situation, there is a correlation between the EDD and the AD, such that a large or significant variance or change in the envelope delay distortion may be correlated with a large or significant variance or change in the attenuation distortion. In contrast with the loaded loops, however, in the PCM codec filter case, the EDD is also very severe on both sides of the 4 kHz channel, also due to the fact that the PCM codec filter may be modeled as a bandpass filter rather than a low pass filter. Similar considerations may also apply to the filtering found in analog trunk sections of the PSTN. As a consequence, the EDD considerations discussed below apply to a wide range of network environments in which the variance of the EDD may be correlated with the variance of the AD, and may apply, for example, in any situation in which there is an increase in EDD corresponding to an increase in AD.

As mentioned above, in the V.34 protocol, for all symbol rates except 3429 (which uses the entire available bandwidth), 2 carrier frequencies were specified. A high carrier frequency was specified to avoid low frequencies under some circumstances, particularly high EDD and non-linearity (from line card transformers). A low carrier frequency was specified to avoid excessive AD at the upper edge of the PCM codec filters. As a consequence, additional transmit pre-emphasis curves having exponential AD characteristics were specified to compensate for the PCM codec filter roll off at the upper edge of the band (i.e., in the higher portion of the 4 kHz frequency spectrum or band). EDD, however, is unspecified for the pre-emphasis curves in the V.34 protocol, which instead (and possibly erroneously) attempted to rely upon SNR measurements from line probing, which as mentioned above may not be overly reflective of the final duplex SNR (as echo cancellers and equalizers are not operating during probing, both of which may be affected by large EDD).

As a consequence, most currently available V.34 modems typically select a less than optimal (or wrong) symbol rate under certain circumstances, especially when significant or extreme EDD is present at the high end or portion of the frequency band. As an example, ANSI TIA TSB-37A channel 19c5 may be considered, which consists of a loaded loop on one side and a non-loaded loop on the other side (TLC-5), with 2 PCM links in tandem (IC 19c), with corresponding AD and EDD measurements (according to TSB-37A). Given the V.34 assumption that the low end of the frequency spectrum should be avoided to stay away from potentially large EDD, a high level of attenuation distortion at 150 Hz may be measured during the line probe, resulting in a V.34 modem selecting a high carrier frequency of 1920 Hz for a 3200 symbol rate, and potentially ignoring significant EDD at the high end of the spectrum. The end result of such a selection process is inefficient or non-existent data transmission (effectively inoperable DCDs due to constant retraining), as neither the receive equalizer nor the near end echo canceler can span the dispersion of the receive signal or echo signal respectively. Some of the more sophisticated (and correspondingly expensive) V.34 modems, however, included large enough equalizers and echo cancelers to span the dispersion in time of these signals, and were able to operate under these conditions. For example, the Motorola 326X V.34 modem has a receive equalizer which may span a sufficient time, resulting in an optimal selection for the example above of 3200 symbol rate with the low carrier frequency of 1829 Hz (unless low end non-linearity is the limiting problem), and operation at 26.4 kbit/s virtually error free. Such EDD, however, may be increasingly problematic for higher data rates, such as 31.2 kbps and 33.6 kbps which utilize a 3429 symbol rate. This may result in either significantly more expensive V.34 implementations due to a significantly increased receive equalizer size, or in accordance with the present invention, the use of an apparatus and method for determining symbol rates and carrier frequencies to maximize data throughput, in the presence of significant EDD (while retaining a more limited equalizer size).

In addition to the envelope delay distortion characteristic of the channel, the symbol rate and carrier frequency determination methodology of the present invention may also be useful for problems encountered with certain types of channels, such as ADPCM or other subsampled systems. In particular, an ECI ADPCM system is subsampled at 6400 Hz, rather than the 8000 Hz of standard systems. The EDD and attenuation distortion of such as system is quite similar to the attenuation distortion discussed above for a PCM codec filter, with the exception that the more significant response roll off occurs in the vicinity of 3000 Hz rather than 3400 Hz. Because of the subsampling, however, aliasing may occur in the upper portion of the band, as all signals in the frequency range greater than 3200 Hz would be aliased back in band or on top of the original, true signal. For example, when a 3000 symbol rate is utilized, an aliasing tone may also occur at 3400 Hz (sampling frequency of 6400 Hz minus 3000 Hz). In these circumstances, a prior art V.34 modem would incorrectly select a 3000 Hz symbol rate, which is one symbol rate higher than the correct symbol rate of 2743 with a carrier frequency of 1646 Hz. As a consequence, to avoid an aliased signal from being misinterpreted as data, in accordance with the present invention, also based upon the variance (roll off) of the EDD (and its correlation with the variance of the AD), various symbol rates and corresponding carrier frequencies should also be eliminated from consideration in the training process, such as the 3429 Hz and 3000 Hz symbol rates and their corresponding carrier frequencies.

Figure 8:
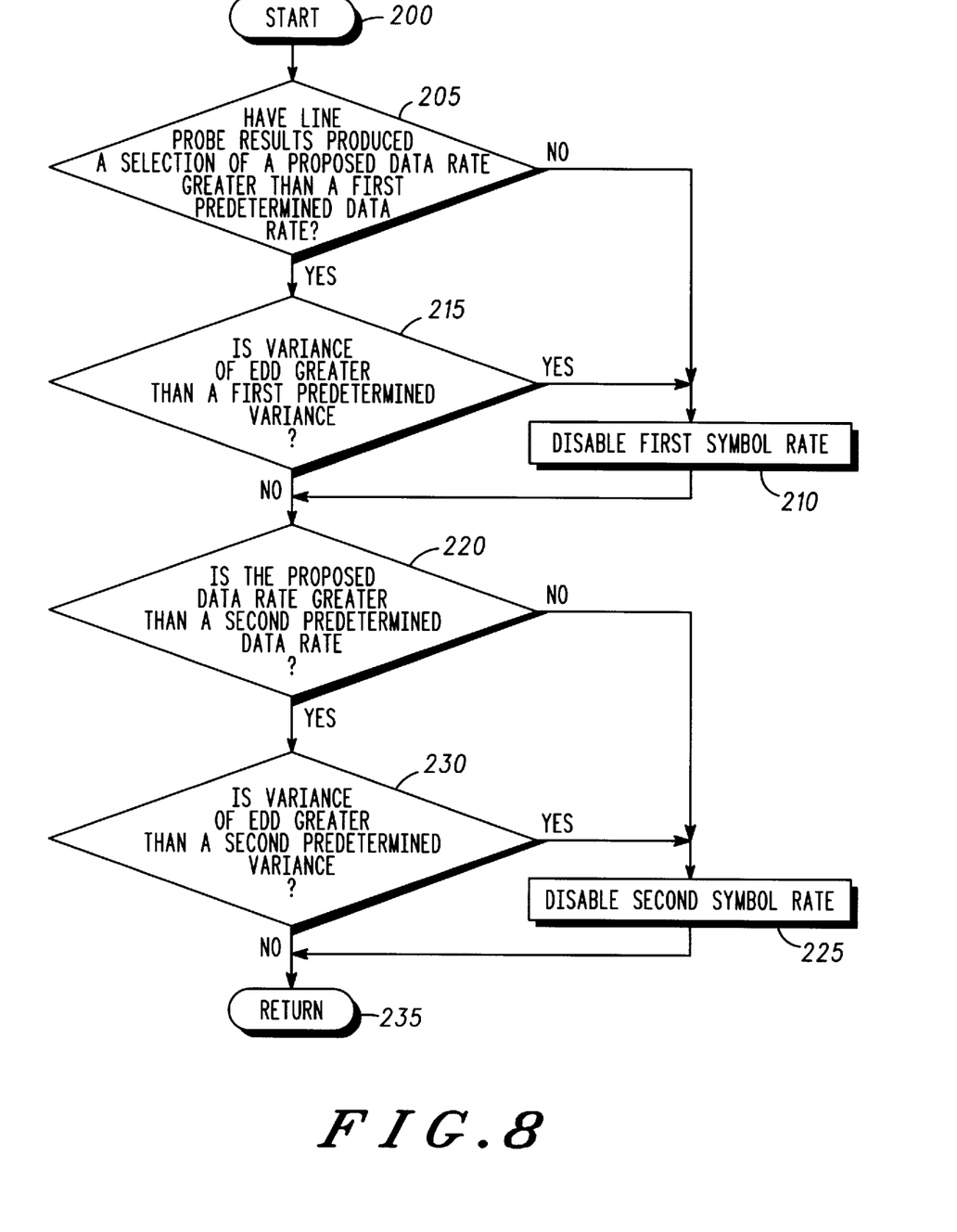
FIG. 8 is a flow chart illustrating a symbol rate and carrier frequency selection method in accordance with the present invention.

FIG. 8 is a flow diagram illustrating the method of the present invention. As mentioned above, this method may be embodied as a set of program instructions in the processor 108 illustrated in FIG. 3, in the microprocessor 107 and DSP 106 illustrated in FIG. 2, or as stored on a computer readable medium (such as a floppy disk or CD ROM) for use as a software modem in a computer having a processor (such as a Pentium® processor). Referring to FIG. 8, beginning with start step 200, the method determines in step 205 whether the results of the line probe have resulted in the initial selection of a proposed data rate which is greater than a first predetermined data rate, such as 24 kbps. Such initial selection of a data rate is part of the training procedures of the V.34 protocol, and may be implemented, for example, utilizing the apparatus and method disclosed in U.S. Pat. No. 5,715,277, entitled "Apparatus And Method For Determining A Symbol Rate And A Carrier Frequency For Data Transmission And Reception incorporated by reference herein. If the proposed data rate is not greater than a first predetermined data rate in step 205, then a first symbol rate (and corresponding carrier frequency) may be eliminated (or disabled) from consideration in the training process, step 210. For example, if the initially proposed data rate is less than 24 kbps, then various symbol rates such as 3429 are unnecessary, and need not be considered. If the proposed data rate is greater than a first predetermined data rate in step 205, then in step 215, the variance of the envelope delay distortion (also referred to as a variance of an envelope delay distortion parameter) in the upper portion of the spectrum is examined to determine whether it is greater than a first predetermined variance (or threshold). The EDD (and AD) are referred to herein as parameters because in the preferred embodiment, these quantities are indirectly measured or inferred, for example, as a correlate of attenuation distortion or the transmit pre-emphasis filter selection. As mentioned above, the first predetermined variance of the EDD (or EDD parameter) may be empirically determined, as a threshold level beyond which the level of EDD is significant. In addition, also as mentioned above, the determination or measurement of the EDD may be inferred from a correlation with the attenuation distortion. When the variance of the EDD in the upper portion of the spectrum is greater than the first predetermined variance (or threshold) in step 215, then the first symbol rate (and any corresponding carrier frequencies) may be eliminated (or disabled) from consideration in the training process, returning to step 210. For example, in the preferred embodiment, when the variance of the EDD in the upper portion of the spectrum is significant, the 3429 symbol rate is eliminated from consideration in the training procedures. When the variance of the EDD in the upper portion of the spectrum is not greater than the first predetermined variance (or threshold) in step 215, or following elimination of a first symbol rate in step 210, then the method may proceed (as an option) to determine whether additional symbol rates (and corresponding carrier frequencies) should be eliminated from consideration in the training process, proceeding to step 220.

Continuing to refer to FIG. 8, if the proposed data rate is less than a second predetermined data rate in step 220, then a second symbol rate (and any corresponding carrier frequencies) may be eliminated (or disabled) from consideration in the training process, step 225. For example, if the initially proposed data rate is less than 19.2 kbps, then various symbol rates such as 3000 are unnecessary, and need not be considered. If the proposed data rate is greater than the second predetermined data rate in step 220, indicating that the second symbol rate should be considered initially, then in step 230, the variance of the EDD in the upper portion of the spectrum is examined to determine whether it is greater than a second predetermined variance (or threshold). When the variance of the EDD in the upper portion of the spectrum is greater than the second predetermined variance (or threshold) in step 230, then the second symbol rate (and corresponding carrier frequency) may be eliminated (or disabled) from consideration in the training process, returning to step 225. For example, in the preferred embodiment, when the variance of the EDD in the upper portion of the spectrum is significant and occurs at a lower frequency, such as at 3 kHz in the ADPCM case, then the 3000 symbol rate is eliminated from consideration in the training procedures. When the variance of the EDD in the upper portion of the spectrum is not greater than the second predetermined variance (or threshold) in step 230, or following elimination of a second symbol rate in step 225, then the method may end, return step 235, with all remaining symbol rates (i.e. all symbol rates available under V.34 which have not been eliminated from consideration in either steps 210 or 225) available for consideration in the remainder of the training procedures. Alternatively, the method may continue to determine whether additional symbol rates (and corresponding carrier frequencies) should be eliminated from consideration in the training process, for example, returning to step 220 and substituting a third or additional threshold level, to correspond to a third symbol rate (with corresponding carrier frequencies).

Under ideal circumstances, the variance in the EDD utilized in steps 215 and 230 would be computed during the line probe portion of the training procedures. Such a calculation, however, would be both computationally intensive and possibly impractical because, as mentioned above, due to the 150 Hz spacing between line probe tones, resolution of the EDD at the band edges may be poor. Given this situation, in the preferred embodiment, the variance or variation in EDD is inferred or estimated from the variance or variation in the attenuation distortion measured during the line probe portion of the training period. Based upon the attenuation distortion measurements, one of the ten available transmit pre-emphasis filters (numbered one through ten in the V.34 protocol specification) is selected corresponding to each symbol rate. (The V.34 protocol also specifies an "eleventh" filter, numbered zero, which provides zero dB (no) pre-emphasis.) In the preferred embodiment, based upon the initially selected data rate and the transmit pre-emphasis filter selected (corresponding to the symbol rate which supports that data rate), symbol rates (and corresponding carrier frequencies) otherwise available are eliminated from consideration in the subsequent portions of the training procedures. Following the correlation between EDD and AD discussed above, the approximate frequency region in which the EDD starts to become significant may be inferred from the frequency point or range, corresponding to each symbol rate, in which the transmit pre-emphasis curve estimate substantially increases or decreases.

As an empirical example, for a particular test line that the Motorola 326X V.34 modem was being subjected to, the transmit pre-emphasis filter selections were (numbered in accordance with the V.34 protocol specification section 5.4):

2400 sym/s=0

3000 sym/s=7

3200 sym/s=8

3429 sym/s=A(10) In reviewing these transmit pre-emphasis filter selections, one may observe that the EDD, as a correlate of the AD, was becoming of minor significance at 3000 symbols/s, and became of major significance clearly by 3429 symbols/s with the selection of a significantly exponential (rather than linear) transmit pre-emphasis filter. For any given modem or other DCD, the point at which the transmit pre-emphasis filter selection correlates with significant EDD (and AD) may be empirically determined and calibrated, to determine how much EDD may be tolerated, based upon block error rates and data throughput, for each symbol rate and type of channel. In effect, the goal of this calibration is to determine how much dispersion is represented given the exponential pre-emphasis estimate performed by any particular manufacturer's DCD (with its particular equalizer span), and given that estimate, what symbol rate may be realistically achieved without danger of a continual retrain condition or a significant diminution of data throughput.

In the preferred embodiment, the transmit pre-emphasis filter selection is performed utilizing the invention disclosed in U.S. Pat. No. 5,533,049, entitled "Method, Digital Signal Processing Module And System For Efficiently Selecting A Pre-Emphasis Filter During Line Probing. In addition, symbol rate and carrier frequency selection may be performed in accordance with the invention disclosed in U.S. Pat. No. 5,715,277, entitled "Apparatus And Method For Determining A Symbol Rate And A Carrier Frequency For Data Transmission And Reception, followed by the utilization of the invention disclosed herein to eliminate possible V.34 symbol rates (and carrier frequencies) from consideration during the training process. As disclosed in these patent applications, the transmitted probe signal is received via a channel, with the transmitted probe signal having a sequence of a plurality of tones having predetermined frequency, amplitude and phase characteristics, the transmitted probe signal having a first power level and a second power level, with the transmitted probe signal received to form a received probe signal having a plurality of sets of received probe tones, and with each set of received probe tones having a plurality of probe tone frequencies. As disclosed in the U.S. Pat. No. 5,533,049, from the received probe signal, spectrum indexes may be formed, corresponding to each probe tone frequency, and the channel response may be formed, corresponding to a weighted summation, combination or average of a channel characteristic for the spectrum index with the channel characteristics of its two nearest neighbor indexes, to form three combined spectrum values S1, S2, and S3. Depending upon the ranges and ratios of S1, S2, and S3, various transmit pre-emphasis filters may be selected. Accordingly, the variance of the EDD or AD, as used herein, may be measured by, and consequently mean and include, the various ratios formed by S1, S2 and S3. For example, as disclosed in the Lin application, when S3 is greater than S2, and S2 is greater than S1, for a range of S3/S2 of approximately 0.32–0.50, having an approximate loss of 3–5 dB with a compensation of approximately 2 dB, a transmit pre-emphasis filter is selected having an index of 7.

Figure 9:
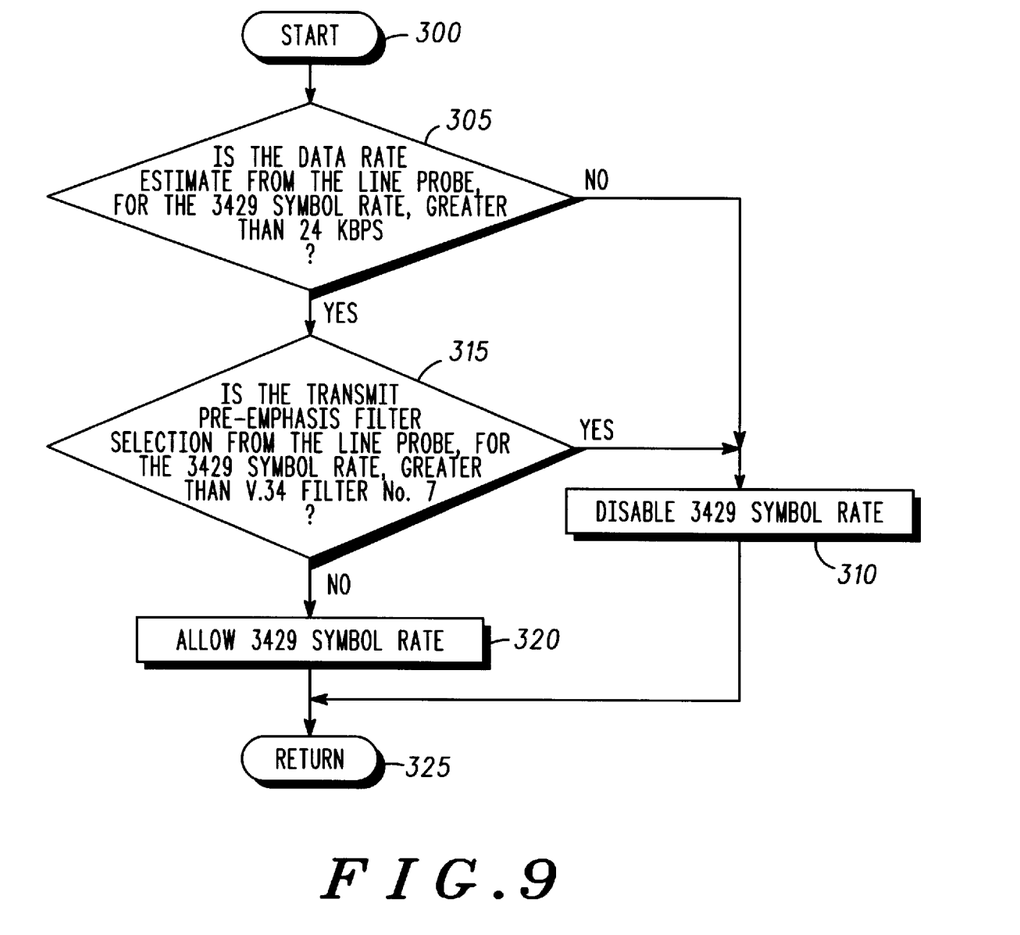
FIG. 9 is a flow diagram illustrating the symbol rate and carrier frequency selection method of the preferred embodiment of the present invention.

FIG. 9 is a flow diagram illustrating the symbol rate and carrier frequency selection methodology of the preferred embodiment of the present invention. Beginning with start step 300, the method determines whether the data rate estimate from the line probe, for the 3429 symbol rate, is greater than 24 kbps, step 305. When the data rate estimate from the line probe, for the 3429 symbol rate, is not greater than 24 kbps in step 305, then the 3429 symbol rate is disabled (i.e., eliminated from consideration as an available symbol rate during the remainder of the training process), step 310. In the preferred embodiment, the 3429 symbol rate is disabled by setting the maximum bit rate (for that 3429 symbol rate) equal to zero. When the data rate estimate from the line probe, for the 3429 symbol rate, is greater than 24 kbps in step 305, then in step 315, the method determines whether the transmit pre-emphasis filter selection from the line probe, for the 3429 symbol rate, is greater than V.34 filter number 7 (i.e., is equal to V.34 filter number 8, 9 or 10). When the transmit pre-emphasis filter selection from the line probe, for the 3429 symbol rate, is greater than V.34 filter number 7 in step 315, then the 3429 symbol rate is disabled, returning to step 310. When the transmit pre-emphasis filter selection from the line probe, for the 3429 symbol rate, is not greater than V.34 filter number 7 in step 315, then the 3429 symbol rate is allowed, step 320, and the method may end, return step 325. Depending upon the calibration discussed above, the method illustrated in FIG. 10 may be repeated for additional symbol rates, calibrated for a selected data rate in step 305 and for a selected transmit pre-emphasis filter in step 315. For example, as illustrated in FIG. 8, for repetition for the 3000 symbol rate, the method would be repeated with a recalibration for a lower data rate in step 305, such as 19.2 kbps, and for a transmit pre-emphasis filter level in step 315, such as filter number 8.

In summary, FIGS. 2, 3 and 8 disclose an apparatus 100 (or 101) for data transmission and reception, the apparatus 100 (or 101) having an initial training period for determining a symbol rate for data transmission and reception from a plurality of symbol rates to form a selected symbol rate, from a transmitted probe signal received via a channel 102, the transmitted probe signal having a sequence of a plurality of tones having predetermined frequency, amplitude and phase characteristics, the transmitted probe signal having a predetermined frequency spectrum, the transmitted probe signal received to form a received probe signal having a plurality of sets of received probe tones, each set of received probe tones having a plurality of probe tone frequencies, in which a proposed data rate selected from a plurality of data rates from the received probe signal. The apparatus 100 (or 101) then comprises, first, a data access arrangement 104 coupleable to the channel 102 to receive the transmitted probe signal, to form a received probe signal; second, an analog-digital converter 105 coupled to the data access arrangement 104 to sample and convert the received probe signal to form a plurality of sets of received probe tones; and third, a processor 108 (or microprocessor 107 and DSP 106) coupled to the analog-digital converter 105 to receive the plurality of sets of received probe tones, the processor 108 responsive through a set of program instructions to determine a variance of an envelope delay distortion parameter over the predetermined frequency spectrum from the received probe signal (step 215); when the proposed data rate is greater than a first predetermined data rate and when the variance of the envelope delay distortion parameter is greater than a first predetermined variance (steps 205 and 215), the processor 108 further responsive to disable a first symbol rate from the plurality of symbol rates to form a plurality of remaining symbol rates (step 210) and to determine the selected symbol rate for data transmission and reception from the plurality of remaining symbol rates.

Also in summary, in another embodiment, FIG. 8 discloses a software modem for data transmission and reception, the software modem stored as a set of program instructions on a computer readable medium, the software modem utilizable in conjunction with a computer having an initial training period for determining a symbol rate for data transmission and reception from a plurality of symbol rates to form a selected symbol rate, from a transmitted probe signal received via a channel, the transmitted probe signal having a sequence of a plurality of tones having predetermined frequency, amplitude and phase characteristics, the transmitted probe signal having a predetermined frequency spectrum, the transmitted probe signal received to form a received probe signal having a plurality of sets of received probe tones, each set of received probe tones having a plurality of probe tone frequencies, in which a proposed data rate selected from a plurality of data rates from the received probe signal. The software modem then comprises, first, means for determining a variance of an envelope delay distortion parameter over the predetermined frequency spectrum from the received probe signal (step 215); second, when the proposed data rate is greater than a first predetermined data rate (step 205) and when the variance of the envelope delay distortion parameter is greater than a first predetermined variance (step 215), means for disabling a first symbol rate from the plurality of symbol rates to form a plurality of remaining symbol rates (step 210); and third, means for determining the selected symbol rate for data transmission and reception from the plurality of remaining symbol rates.

Lastly in summary, FIGS. 2, 3 and 9 disclose an apparatus 100 (or 101) for data transmission and reception, the apparatus having an initial training period for determining a symbol rate for data transmission and reception from a plurality of symbol rates to form a selected symbol rate, from a transmitted probe signal received via a channel, the transmitted probe signal having a sequence of a plurality of tones having predetermined frequency, amplitude and phase characteristics, the transmitted probe signal having a predetermined frequency spectrum, the transmitted probe signal received to form a received probe signal having a plurality of sets of received probe tones, and each set of received probe tones having a plurality of probe tone frequencies. The apparatus then comprises, first, a data access arrangement 104 coupleable to the channel 102 to receive the transmitted probe signal, to form a received probe signal; second, an analog-digital converter 105 coupled to the data access arrangement to sample and convert the received probe signal to form a plurality of sets of received probe tones; and third, a processor 108 (or microprocessor 107 and DSP 106) coupled to the analog-digital converter 105 to receive the plurality of sets of received probe tones, the processor responsive through a set of program instructions to determine a proposed data rate selected from a plurality of data rates from the received probe signal and to determine a selected transmit pre-emphasis filter from a plurality of transmit pre-emphasis filters from the received probe signal (steps 305 and 315); the processor further responsive, when the proposed data rate is greater than a first predetermined data rate and when the selected transmit pre-emphasis filter is greater than a first predetermined pre-emphasis level (steps 305 and 315), to disable a first symbol rate from the plurality of symbol rates to form a plurality of remaining symbol rates (step 310) and to determine the selected symbol rate for data transmission and reception from the plurality of remaining symbol rates.

A major advantage of a modem or other data communication device having this symbol rate and carrier frequency determination capability, in accordance with the present invention, is that the adverse effects of envelope delay distortion are minimized. In addition, the modem or other data communication device is able to rapidly determine the optimum symbol rate and carrier frequency by processing a predefined probe signal, to optimize the bit rate for data transmission and reception, with robust performance under conditions in which other modems or data communications would not operate altogether or would operate suboptimally.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method of determining a symbol rate for data transmission and reception from a plurality of symbol rates to form a selected symbol rate, from a transmitted probe signal received via a channel, the transmitted probe signal having a sequence of a plurality of tones having predetermined frequency, amplitude and phase characteristics, the transmitted probe signal having a predetermined frequency spectrum, the transmitted probe signal received to form a received probe signal having a plurality of sets of received probe tones, each set of received probe tones having a plurality of probe tone frequencies, a proposed data rate selected from a plurality of data rates from the received probe signal, the method comprising:

(a) determining a variance of an envelope delay distortion parameter over the predetermined frequency spectrum from the received probe signal;

(b) when the proposed data rate is greater than a first predetermined data rate and when the variance of the envelope delay distortion parameter is greater than a first predetermined variance, disabling a first symbol rate from the plurality of symbol rates to form a plurality of remaining symbol rates; and (c) determining the selected symbol rate for data transmission and reception from the plurality of remaining symbol rates.

2. The method of claim 1, further comprising:

(d1) determining a carrier frequency corresponding to the selected symbol rate to form a corresponding carrier frequency.

3. The method of claim 2 wherein the selected symbol rate and corresponding carrier frequency corresponds to an optimal data rate of the plurality of data rates.

4. The method of claim 1, further comprising:

(d2) repeating step (b) for additional symbol rates of the plurality of symbol rates prior to determining step (c).

5. The method of claim 1 wherein step (b) further comprises:

(b1) when the proposed data rate is greater than a second predetermined data rate and when the variance of the envelope delay distortion parameter is greater than a second predetermined variance, disabling a second symbol rate from the plurality of symbol rates to form the plurality of remaining symbol rates.

6. The method of claim 1 wherein the envelope delay distortion parameter is determined as a correlate of an attenuation distortion parameter.

7. The method of claim 1 wherein the envelope delay distortion parameter is determined as a correlate of a selected transmit pre-emphasis filter.

8. The method of claim 7 wherein the selected transmit pre-emphasis filter is determined as a function of a ratio of spectrum values.

9. The method of claim 1 wherein the variance of the envelope delay distortion parameter is determined for an upper 1000 Hz portion of the predetermined frequency spectrum.

10. The method of claim 1 wherein the determination of the variance of the envelope delay distortion parameter is a correlate of determining whether the channel is an ADPCM channel.

11. An apparatus for data transmission and reception, the apparatus having an initial training period for determining a symbol rate for data transmission and reception from a plurality of symbol rates to form a selected symbol rate, from a transmitted probe signal received via a channel, the transmitted probe signal having a sequence of a plurality of tones having predetermined frequency, amplitude and phase characteristics, the transmitted probe signal having a predetermined frequency spectrum, the transmitted probe signal received to form a received probe signal having a plurality of sets of received probe tones, each set of received probe tones having a plurality of probe tone frequencies, a proposed data rate selected from a plurality of data rates from the received probe signal, the apparatus comprising:

a data access arrangement coupleable to the channel to receive the transmitted probe signal, to form a received probe signal;

an analog-digital converter coupled to the data access arrangement to sample and convert the received probe signal to form a plurality of sets of received probe tones; and a processor coupled to the analog-digital converter to receive the plurality of sets of received probe tones, the processor responsive through a set of program instructions to determine a variance of an envelope delay distortion parameter over the predetermined frequency spectrum from the received probe signal; when the proposed data rate is greater than a first predetermined data rate and when the variance of the envelope delay distortion parameter is greater than a first predetermined variance, the processor further responsive to disable a first symbol rate from the plurality of symbol rates to form a plurality of remaining symbol rates and to determine the selected symbol rate for data transmission and reception from the plurality of remaining symbol rates.

12. The apparatus of claim 11, wherein the processor is further responsive to determine a carrier frequency corresponding to the selected symbol rate to form a corresponding carrier frequency.

13. The apparatus of claim 11, wherein the selected symbol rate and corresponding carrier frequency corresponds to an optimal data rate of the plurality of data rates.

14. The apparatus of claim 11, wherein the processor is further responsive, when the proposed data rate is greater than a second predetermined data rate and when the variance of the envelope delay distortion parameter is greater than a second predetermined variance, to disable a second symbol rate from the plurality of symbol rates to form the plurality of remaining symbol rates.

15. The apparatus of claim 11, wherein the processor is further responsive to determine the envelope delay distortion parameter as a correlate of an attenuation distortion parameter.

16. The apparatus of claim 11, wherein the processor is further responsive to determine the envelope delay distortion parameter as a correlate of a selected transmit pre-emphasis filter.

17. The apparatus of claim 16, wherein the processor is further responsive to determine the selected transmit pre-emphasis filter as a function of a ratio of spectrum values.

18. The apparatus of claim 11, wherein the processor is further responsive to determine the variance of the envelope delay distortion parameter for an upper 1000 Hz portion of the predetermined frequency spectrum.

19. An apparatus for data transmission and reception, the apparatus having an initial training period for determining a symbol rate for data transmission and reception from a plurality of symbol rates to form a selected symbol rate, from a transmitted probe signal received via a channel, the transmitted probe signal having a sequence of a plurality of tones having predetermined frequency, amplitude and phase characteristics, the transmitted probe signal having a predetermined frequency spectrum, the transmitted probe signal received to form a received probe signal having a plurality of sets of received probe tones, each set of received probe tones having a plurality of probe tone frequencies, the apparatus comprising:

a data access arrangement coupleable to the channel to receive the transmitted probe signal, to form a received probe signal;

an analog-digital converter coupled to the data access arrangement to sample and convert the received probe signal to form a plurality of sets of received probe tones; and a processor coupled to the analog-digital converter to receive the plurality of sets of received probe tones, the processor responsive through a set of program instructions to determine a proposed data rate selected from a plurality of data rates from the received probe signal and to determine a selected transmit pre-emphasis filter from a plurality of transmit pre-emphasis filters from the received probe signal; the processor further responsive, when the proposed data rate is greater than a first predetermined data rate and when the selected transmit pre-emphasis filter is greater than a first predetermined pre-emphasis level, to disable a first symbol rate from the plurality of symbol rates to form a plurality of remaining symbol rates and to determine the selected symbol rate for data transmission and reception from the plurality of remaining symbol rates.

20. The apparatus of claim 19, wherein the processor is further responsive to determine a carrier frequency corresponding to the selected symbol rate to form a corresponding carrier frequency.

21. The apparatus of claim 19, wherein the selected symbol rate and corresponding carrier frequency corresponds to an optimal data rate of the plurality of data rates.

22. The apparatus of claim 19, wherein the processor is further responsive, when the proposed data rate is greater than a second predetermined data rate and when the selected transmit pre-emphasis filter is greater than a second predetermined pre-emphasis level variance, to disable a second symbol rate from the plurality of symbol rates to form the plurality of remaining symbol rates.

23. The apparatus of claim 19, wherein the processor is further responsive to determine the selected transmit pre-emphasis filter as a correlate of the envelope delay distortion.

24. The apparatus of claim 23, wherein the processor is further responsive to determine the selected transmit pre-emphasis filter as a function of a ratio of spectrum values.

25. A software modem for data transmission and reception, the software modem stored as a set of program instructions on a computer readable medium, the software modem utilizable in conjunction with a computer having an initial training period for determining a symbol rate for data transmission and reception from a plurality of symbol rates to form a selected symbol rate, from a transmitted probe signal received via a channel, the transmitted probe signal having a sequence of a plurality of tones having predetermined frequency, amplitude and phase characteristics, the transmitted probe signal having a predetermined frequency spectrum, the transmitted probe signal received to form a received probe signal having a plurality of sets of received probe tones, each set of received probe tones having a plurality of probe tone frequencies, a proposed data rate selected from a plurality of data rates from the received probe signal, the software modem comprising:

means for determining a variance of an envelope delay distortion parameter over the predetermined frequency spectrum from the received probe signal;

when the proposed data rate is greater than a first predetermined data rate and when the variance of the envelope delay distortion parameter is greater than a first predetermined variance, means for disabling a first symbol rate from the plurality of symbol rates to form a plurality of remaining symbol rates; and means for determining the selected symbol rate for data transmission and reception from the plurality of remaining symbol rates.

26. The software modem of claim 25, further comprising:

means for determining a carrier frequency corresponding to the selected symbol rate to form a corresponding carrier frequency.

27. The software modem of claim 25, further comprising:

when the proposed data rate is greater than a second predetermined data rate and when the variance of the envelope delay distortion parameter is greater than a second predetermined variance, means for disabling a second symbol rate from the plurality of symbol rates to form the plurality of remaining symbol rates.

28. The software modem of claim 25, further comprising:

means for determining the envelope delay distortion parameter as a correlate of an attenuation distortion parameter.

29. The software modem of claim 25, further comprising:

means for determining the envelope delay distortion parameter as a correlate of a correlate of a selected transmit pre-emphasis filter.

* * * * *